(12) United States Patent
Legge et al.

(10) Patent No.: US 8,963,040 B2
(45) Date of Patent: Feb. 24, 2015

(54) METHOD OF SEPARATING FASTENER SHANKS FROM HEADS OR FRAMES

(75) Inventors: James T. Legge, Rancho Palos Verdes, CA (US); Mervyn Rudgley, Laguna Hills, CA (US)

(73) Assignee: Perfect Point EDM Corporation, Huntington Beach, CA (US)

( * ) Notice: Subject to any disclaimer, the term of this patent is extended or adjusted under 35 U.S.C. 154(b) by 471 days.

(21) Appl. No.: 13/093,684

(22) Filed: Apr. 25, 2011

(65) Prior Publication Data

US 2011/0266258 A1 Nov. 3, 2011

Related U.S. Application Data

(63) Continuation-in-part of application No. 12/603,507, filed on Oct. 20, 2009.

(60) Provisional application No. 61/328,797, filed on Apr. 28, 2010.

(51) Int. Cl.
*B23H 9/00* (2006.01)
*B23H 1/00* (2006.01)
*B23H 1/04* (2006.01)

(52) U.S. Cl.
CPC .. *B23H 9/00* (2013.01); *B23H 1/00* (2013.01); *B23H 1/04* (2013.01); *B23H 9/001* (2013.01)
USPC ...................................................... 219/69.17

(58) Field of Classification Search
USPC ........ 219/69.15, 69.17, 69.2, 69.11; 205/651, 205/654, 665
See application file for complete search history.

(56) References Cited

U.S. PATENT DOCUMENTS

| | | |
|---|---|---|
| 4,135,378 A | 1/1979 | Balon |
| 4,361,745 A | 11/1982 | Rupert et al. |
| 4,543,460 A | 9/1985 | Inoue |
| 4,596,066 A | 6/1986 | Inoue |
| 4,606,007 A | 8/1986 | Inoue |
| 4,608,476 A | 8/1986 | Shimizu |
| 4,629,855 A | 12/1986 | Inoue |
| 4,721,838 A | 1/1988 | Abdukarimov et al. |
| 4,851,634 A | 7/1989 | Vakhidov et al. |
| 4,855,558 A | 8/1989 | Ramsbro |
| 5,051,554 A | 9/1991 | Tsukamoto |
| 5,159,167 A | 10/1992 | Chaikin et al. |
| 5,354,961 A | 10/1994 | Diot et al. |
| 5,420,388 A | 5/1995 | Girardin |
| 5,569,393 A | 10/1996 | Reinhart et al. |
| 5,618,449 A | 4/1997 | Houman et al. |
| 6,385,500 B1 | 5/2002 | Hebbar et al. |
| 6,521,856 B1 | 2/2003 | Marchesi et al. |
| 6,549,240 B1 | 4/2003 | Reitmeier |
| 6,556,886 B1 | 4/2003 | Riva et al. |
| 6,717,094 B2 | 4/2004 | Beaumont |
| 6,737,602 B2 | 5/2004 | Stelter |
| 6,759,620 B2 | 7/2004 | Marchesi et al. |

(Continued)

FOREIGN PATENT DOCUMENTS

| | | | |
|---|---|---|---|
| FR | 2571993 A | * | 4/1986 |
| JP | 2121776 | | 5/1990 |
| JP | 7-24650 A | * | 1/1995 |

*Primary Examiner* — Geoffrey S Evans
(74) *Attorney, Agent, or Firm* — Baker & Hostetler LLP (57) ABSTRACT

A device and method for removal of fasteners by Electro-discharge Machining (EDM) such that portions of the fastener, such as a flange, may be separated from other portions of the fastener, such as a shank.

16 Claims, 12 Drawing Sheets

(56) References Cited

U.S. PATENT DOCUMENTS

| | | |
|---|---|---|
| 6,788,019 B2 | 9/2004 | Imai et al. |
| 6,844,518 B1 | 1/2005 | Coons et al. |
| 7,030,332 B2 | 4/2006 | Hastilow et al. |
| 7,537,610 B2 | 5/2009 | Reiss |
| 7,565,995 B2 | 7/2009 | Delmont |
| 7,594,987 B2 | 9/2009 | Lukic |
| 7,664,565 B2 | 2/2010 | Stammen |
| 7,679,031 B2 | 3/2010 | Yamazaki et al. |
| 2003/0019844 A1* | 1/2003 | Shih ................. 219/69.2 |
| 2005/0184030 A1* | 8/2005 | Bermann et al. ........... 219/69.11 |
| 2010/0096365 A1* | 4/2010 | Gold et al. ............ 219/69.15 |
| 2013/0134133 A1* | 5/2013 | Rudgley et al. ............ 219/69.15 |
| 2013/0277336 A1* | 10/2013 | Rudgley .................... 219/69.15 |

* cited by examiner

METHOD OF SEPARATING FASTENER SHANKS FROM HEADS OR FRAMES

RELATED APPLICATIONS

The instant filing requesting grant of Letters Patent claims full Paris Convention Priority from U.S. Provisional Patent Application 61/328,797, filed Apr. 28, 2010, and U.S. patent application Ser. No. 12/603,507, filed Oct. 21, 2009, as if fully set forth herein.

BACKGROUND

Field

This disclosure relates to electrical discharge machining (EDM).

SUMMARY

According to some exemplary implementations, disclosed is an EDM device, comprising: an erosion electrode configured to be advanced longitudinally through a head of a fastener, the fastener having a shank, the fastener being fixed within a frame, wherein the erosion electrode has an outer radius less than an outer radius of the shank, the difference between the outer radius of the erosion electrode and the outer radius of the shank defining an offset, wherein the erosion electrode is configured to create an eroded space within the fastener and maintain a ligament within the shank, the ligament having a thickness defined by the offset.

The erosion electrode may be a hollow cylinder. The erosion electrode may be a solid cylinder. The erosion electrode may be a plurality of pins. The erosion electrode may be configured to be rotated as it is advanced longitudinally. The erosion electrode may be configured to be rotated about an axis of rotation corresponding to a central axis of the fastener.

The EDM device may further comprise: a power supply configured to provide a voltage difference between the erosion electrode and at least one of the fastener and the frame. The EDM device may further comprise: a ground electrode configured to contact at least one of the fastener and the frame.

be configured to provide the ligament with the thickness configured to sever under an intrinsic force from the frame applied to the head of the fastener. The offset may be between about 0.010 inches and about 0.020 inches. The offset may be between about 0.020 inches and about 0.040 inches. The offset may be between about 0.040 inches and about 0.045 inches.

According to some exemplary implementations, disclosed is a method, comprising: providing an erosion electrode to a fastener in a frame, the fastener having a head extending beyond at least a portion of the frame and a shank at least partly within the frame; creating an eroded space within the fastener, the eroded space having an outer radius less than the outer radius of the shank and extending through the head of the fastener, whereby a ligament of the shank is maintained, the thickness of the ligament being defined by an offset between the outer radius of the eroded space and the outer radius of the shank.

Creating an eroded space may comprise: providing a voltage difference between the erosion electrode and the fastener. Creating an eroded space may comprise: advancing the erosion electrode longitudinally along the axis of the fastener. Creating an eroded space may comprise: rotating the erosion electrode as it is advanced longitudinally.

The method may further comprise: applying an external force to at least one of the shank and a flange of the head, whereby the ligament is severed and the flange is separated from the shank. The external force required to sever the ligament may be within an acceptable tolerance of the frame. An intrinsic force from the frame may be applied to the head of the fastener. The ligament may be sufficiently thin to allow the intrinsic force from the frame to sever the ligament without requiring an external force. The frame may remain intact.

DRAWINGS

The above-mentioned features of the present disclosure will become more apparent with reference to the following description taken in conjunction with the accompanying drawings wherein like reference numerals denote like elements and in which.

DETAILED DESCRIPTION

As used herein, "offset" is the difference between an outer radius of an erosion electrode and an outer radius of a shank, other workpiece, or portion thereof.

As used herein, "outer radius" of an erosion electrode corresponds to the radially outermost limit or distance from a central axis of the erosion electrode, as determined at one or more points in time during a process.

As used herein, "eroded space" is a space that was previously occupied by a workpiece and is created by an erosion process.

As used herein, "ligament" is a portion of a workpiece defined by an eroded space and a boundary of the workpiece (i.e., shank diameter).

As used herein, "external force" is any force selectably applied by a user to a fastener, other workpiece, or portion thereof. As used herein, "punch-out force" is a mechanical force provided to a fastener to cause a portion thereof to dislodge in a direction of the punch-out force.

As used herein, "intrinsic force" is any force applied to fastener 10 that exists while the fastener is in its originally installed state (i.e., prior to operations disclosed herein). An "intrinsic force" may include one that exists and is applied to the fastener by virtue of a frame in which it is installed.

As used herein, "acceptable tolerance" of a frame is determined by at least one of tensile strength (e.g., breaking strength) of a fastener, and tensile strength (e.g., yield strength) of the frame, based on applicable safety guidelines, regulations, and desired outcomes.

Figure 1:
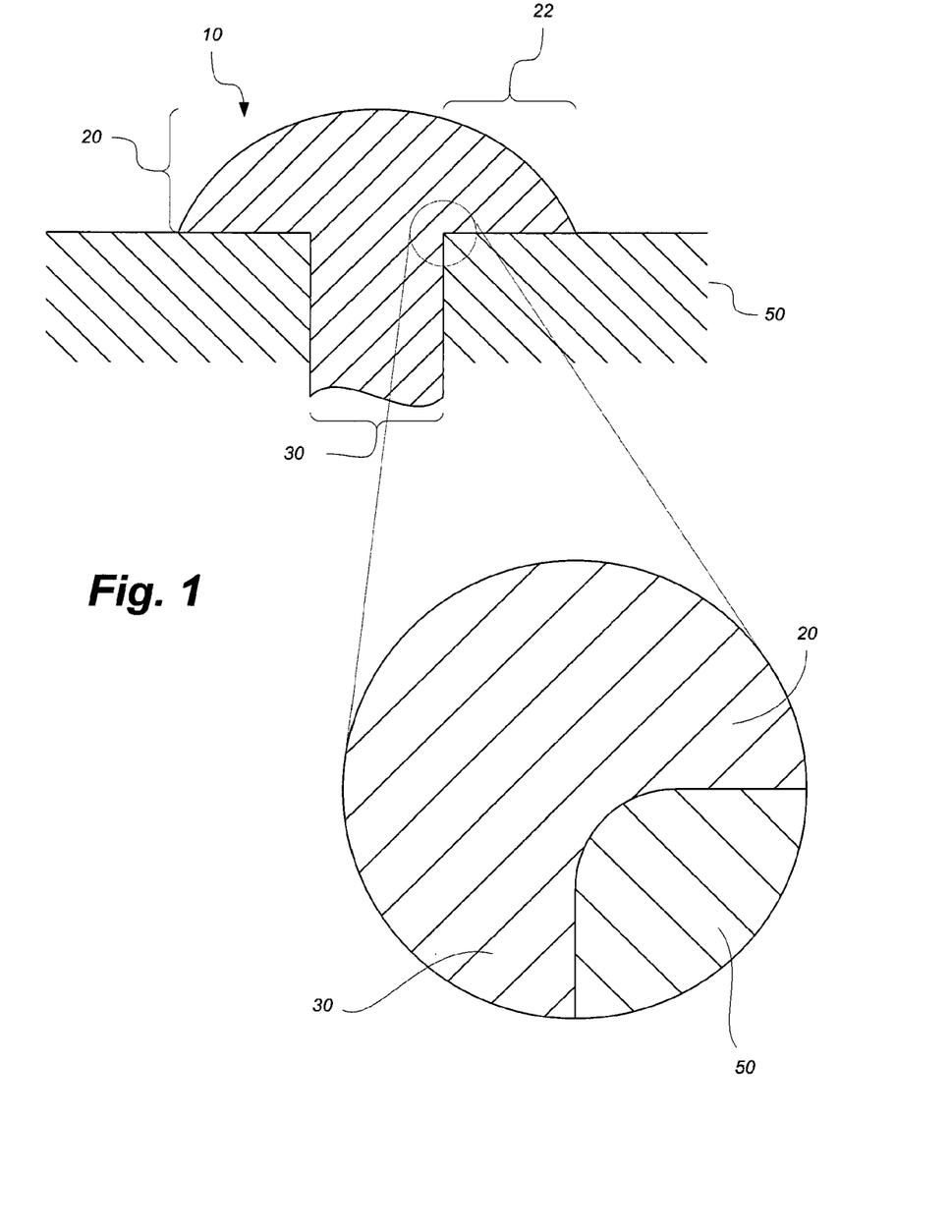
FIG. 1 shows a sectional view of fastener in a frame.
Figure 2:
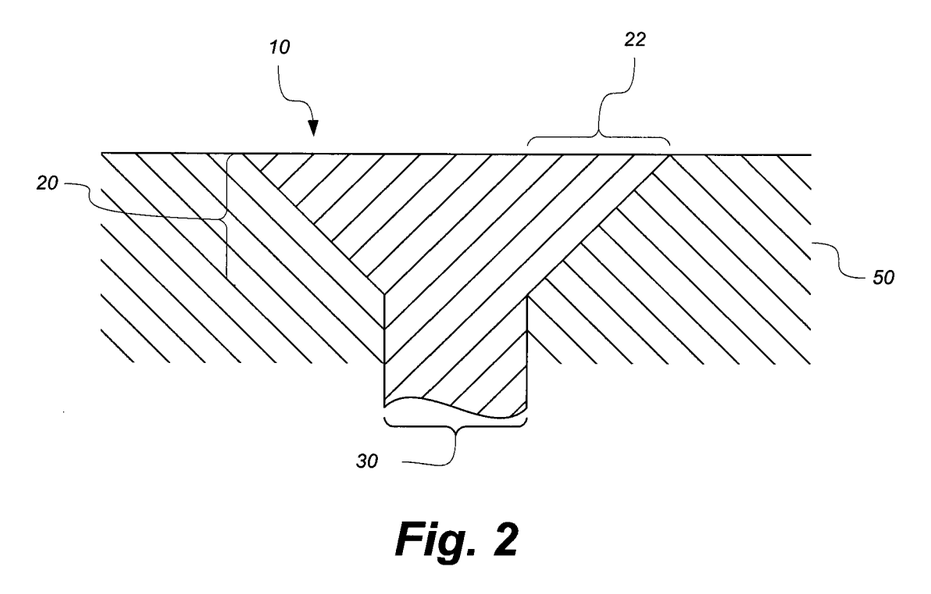
FIG. 2 shows a sectional view of fastener in a frame.

According to some exemplary implementations, disclosed is an EDM device for facilitating separation of head 22 of fastener 10 from shank 30 of fastener 10. As shown in the FIGS. 1 and 2, fastener 10 may include shank 30 extending through at least a portion of frame 50. Shank 30 may have a known or determinable shape and geometry. For example, shank 30 may be generally cylindrical having an outer diameter. As shown in FIGS. 1 and 2, fastener 10 may include head 20 protruding from at least a portion of frame 50. Head 20 may include flange 22, corresponding to the portion of head 20 that extends radially beyond the outer diameter of shank 30. As shown in FIG. 1, fastener 10 may include a fillet transition from head 22 to shank 30, wherein the diameter of fastener 10 decreases in a somewhat gradual manner.

According to some exemplary implementations, devices, systems, and methods of the present disclosure may be applicable to a variety of fastener and frame configurations. Such configurations may include protruding or non-protruding, with or without sleeve about the fastener, threaded or non-threaded, with or without fitted collars, etc. Those having ordinary skill in the art will recognize the variation and variety of fasteners which may be modified or eroded with the disclosed methods and devices, the modification or erosion thereof being within the scope of the present disclosure.

According to some exemplary implementations, as shown in FIG. 1, head 20 may protrude from a surface of frame 50. According to some exemplary implementations, as shown in FIG. 2, head 20 may be flush with a surface of frame 50 (non-protruding). For example, frame 50 may include a countersink portion. While head 20 may extend only beyond some portions of frame 50, it may simultaneously be substantially flush with the surface of frame 50.

According to some exemplary implementations, fastener 10 may interface with at least a portion of frame 50. For example, fastener 10 may be fitted within or threaded onto frame 50. Fastener 10 may interface with a collar (not shown) at a side of frame 50 opposite head 20 of fastener 10. According to some exemplary implementations, it may be advantageous to facilitate removal of fastener 10 without separation thereof from a collar or other structure fixed thereto. For example, it may be advantageous to remove fastener 10 or portions thereof in a direction opposite the side containing head 20.

Figure 3:
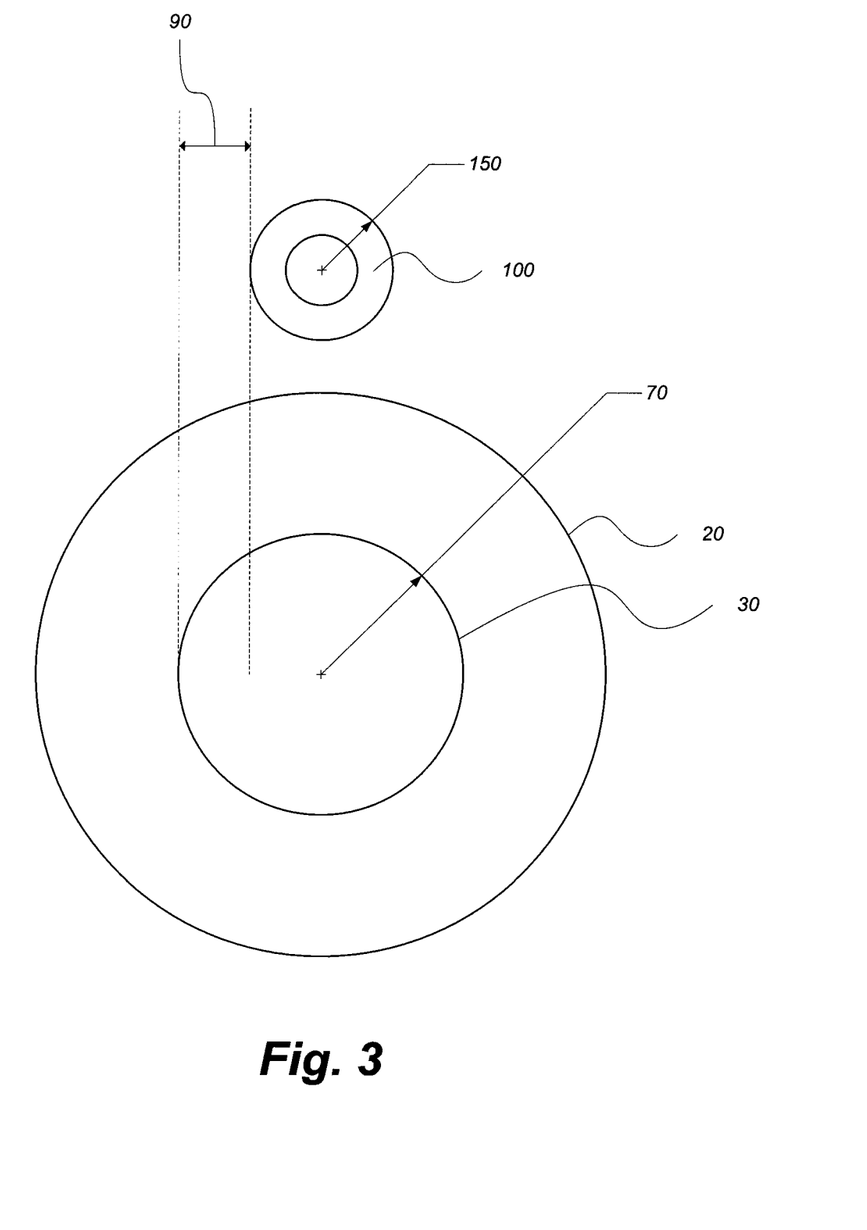
FIG. 3 shows a bottom view of an erosion electrode and a bottom view of a fastener.
Figure 4:
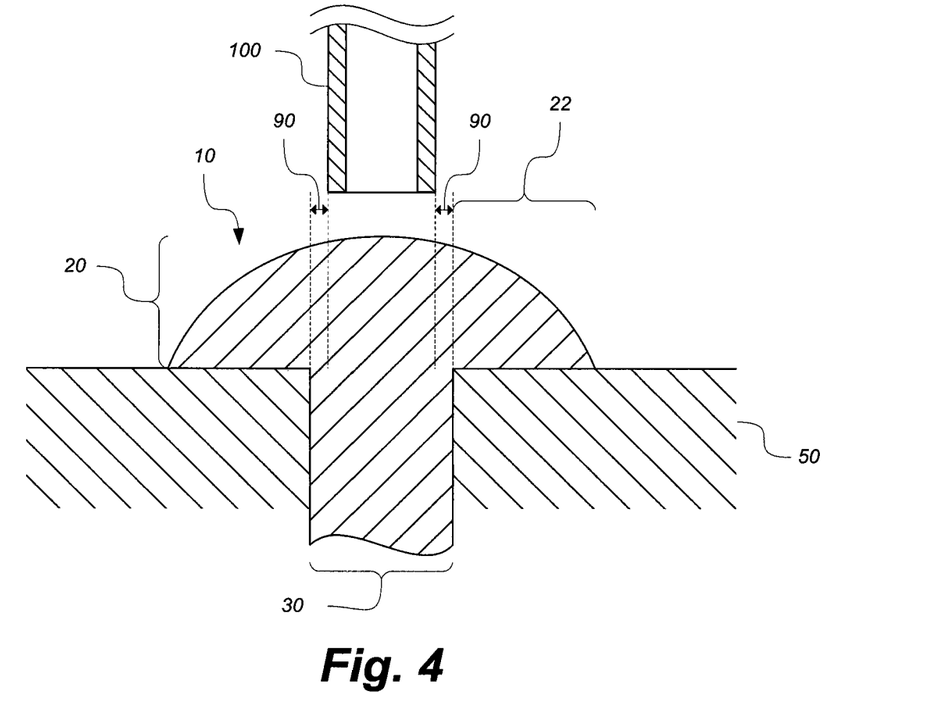
FIG. 4 shows a sectional view of an erosion electrode approaching a fastener.
Figure 5:
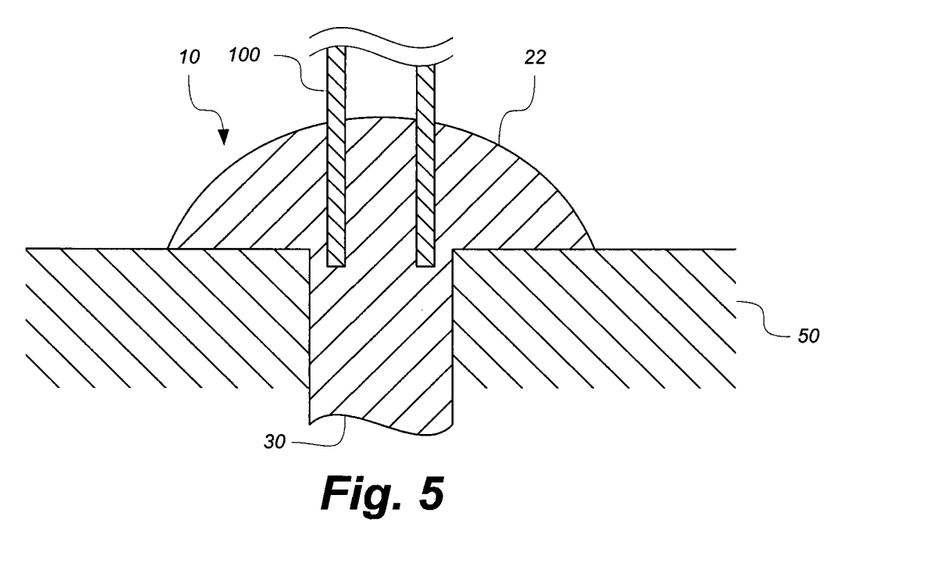
FIG. 5 shows a sectional view of an erosion electrode penetrating a fastener.

According to some exemplary implementations, erosion electrode 100 of an EDM device may be of a variety of shape, sizes, and configurations. According to some exemplary implementations, erosion electrode 100 may be configured to remove head 20, flange 22, or at least portions thereof from shank 30. For example, as shown in FIGS. 3, 4, and 5, erosion electrode 100 may be a hollow cylinder. As shown in FIGS. 3 and 4, erosion electrode 100 may have outer radius 150 less than outer radius 70 of shank 30 of fastener 10. Outer radius 150 of erosion electrode 100 may correspond to the radially outermost limit or distance from a central axis of erosion electrode 100, across one or more points during a process. According to some exemplary implementations, as shown in FIGS. 3 and 4, the difference between outer radius 150 of erosion electrode 100 and outer radius 70 of shank 30 may define offset 90.

Figure 6:
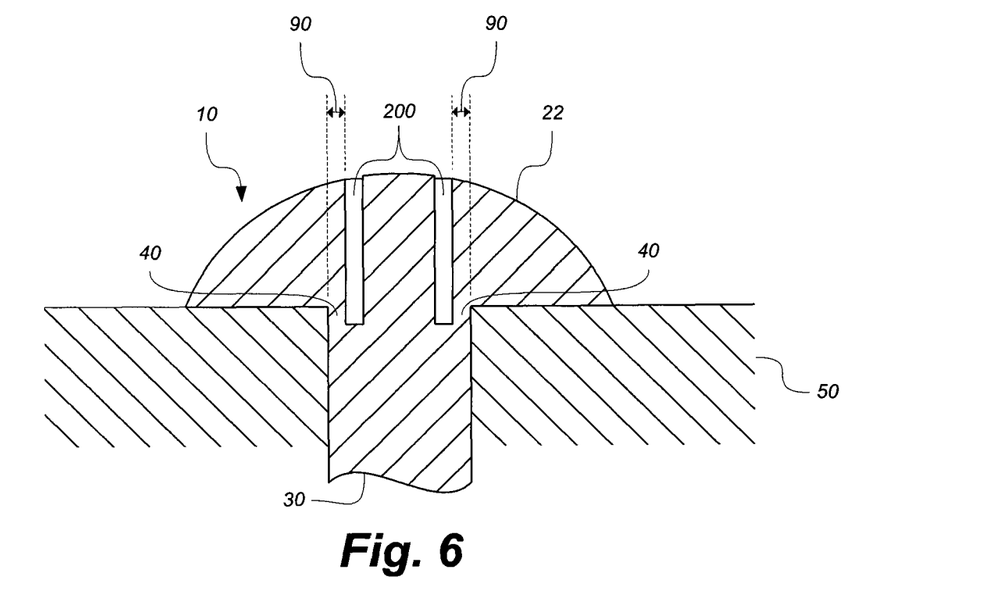
FIG. 6 shows a sectional view of an eroded space in a fastener.

According to some exemplary implementations, erosion electrode 100 may be advanced to penetrate at least a portion of fastener 10. As shown in FIG. 6, erosion electrode 100 may be advanced longitudinally along an axis. The axis may be coaxial with, parallel to, or otherwise aligned with a central axis of fastener 10.

According to some exemplary implementations, erosion electrode 100 may be configured to create eroded space 200 by an EDM process. For example, a voltage difference may be provided from a power supply between erosion electrode 100 and at least one of fastener 10, frame base 50, and any component in electric conductivity with one or more of the above. A dielectric fluid may be provided between erosion electrode 100 and at least one of the above. At a given voltage, the dielectric fluid may experience breakdown, and a plasma event may occur, causing at least a portion of fastener 10 to become eroded, leaving eroded space 200 at the location of the plasma event. A series of plasma events may cumulatively develop eroded space 200.

As shown in FIGS. 4, 5, and 6, erosion electrode 100 may create eroded space 200. Eroded space 200 may have a geometry corresponding to that of erosion electrode 100. For example, eroded space 200 may have an outer radius substantially equal to outer radius 150 of erosion electrode 100. Slight variation between outer radius of erosion electrode 100 and the outer radius of eroded space 200 is contemplated, inasmuch as an EDM process may erode a space that is either substantially similar to or identical to the geometry of erosion electrode 100.

According to some exemplary implementations, creation of eroded space 200 by erosion electrode 100 may define ligament 40. As shown in FIG. 6, ligament 40 may be a portion of fastener 10 that is defined by the outer radius of eroded space 200 (corresponding to outer radius 150 of erosion electrode 100) and outer radius 70 of shank 30. The thickness of ligament 40 may be defined by offset 90. For example, the thickness of ligament 40 may be substantially equal to offset 90. By further example, the thickness of ligament 40 may be determinable based on offset 90.

Figure 7:
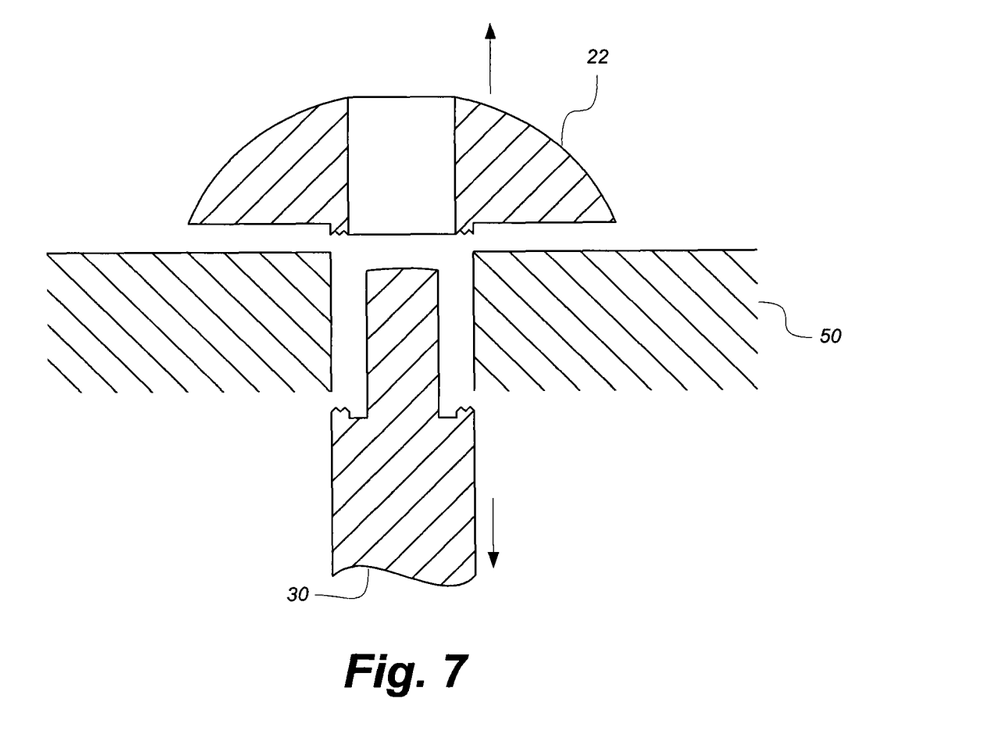
FIG. 7 shows a sectional view of a head of a fastener removed from the shank of the fastener.

According to some exemplary implementations, ligament 40 may facilitate separation of flange 22 from at least a portion of shank 30. For example, as shown in FIG. 7, ligament 40 may be severed, such that fastener 10 is divided into two disparate parts. The disparate parts may include flange 22 and shank 30. Separation of flange 22 from shank 30 may facilitate removal of shank 30 from frame 50 in a direction opposite that of head 20 or flange 22.

According to some exemplary implementations, ligament 40 may be severed by an external force provided after creation of eroded space 200. An external force may be applied to shank 30 in a direction opposite that of head 20 or flange 22 (i.e., a "punch-out force"). The external force may be within an acceptable tolerance of frame 50. For example, frame 50 may be configured to withstand a limited amount of force, based on its structure and composition. Acceptable tolerance of frame 50 may be determined by at least one of tensile strength (e.g., breaking strength) of fastener 10, and tensile strength (e.g., yield strength) of frame 50, based on applicable safety guidelines and regulations. For example, the external force may be determined to be any force under which ligament 40 will rupture without causing plastic deformation of frame 50.

According to some exemplary implementations, ligament 40 may be severed by an intrinsic force from frame 50 applied to head 20 or flange 22 of fastener 10. An intrinsic force may be any force applied to fastener 10 that existed while fastener 10 was in its originally installed state (i.e., prior to operations disclosed herein). For example, frame 50 may be under stress or pressure; head 10 or flange 22 of fastener 10 may be under stress from a collar attached thereto at an end opposite head 20; or fastener 10 may hold frame 50 against another frame, where the two frames may have a tendency to separate. Other intrinsic forces are contemplated and ligament 40 may be responsive thereto.

According to some exemplary implementations, offset 90 may be configured to yield ligament 40 with a thickness configured to sever under an external force or an intrinsic force. Based on materials, structure, and composition of at least fastener 10 and frame 50, features (e.g., thickness) of ligament 40 required to yield a desired result may be known or determinable (for example, by routine experimentation).

According to some exemplary implementations, fastener 10 has a fillet radius, as shown in FIG. 1. According to some exemplary implementations, it is desirable to avoid erosion of frame 50 and to arrange for fastener 10 to fracture at the bottom (most narrow portion) of the fillet radius. Such an arrangement may avoid leaving a burr on shank 30 once it is separated from head 22. Such a burr in with diameter in excess of the remainder of shank 30 might damage frame 50 when shank 30 is driven through frame 50.

According to some exemplary implementations, larger offset 90 provides more tolerance with regard to concentricity of erosion electrode 100 and shank 30. For example, a larger margin of error is allowed for aligning erosion electrode 100 with fastener 10 to avoid erosion of frame 50. According to some exemplary implementations, larger offset 90 requires a larger punch-out force to be applied to sever ligament 40.

According to some exemplary implementations, smaller offset 90 provides less tolerance with regard to concentricity of erosion electrode 100 and shank 30. For example, a smaller margin of error is allowed for aligning erosion electrode 100 with fastener 10 to avoid erosion of frame 50. According to some exemplary implementations, smaller offset 90 requires a smaller punch-out force to be applied to sever ligament 40.

According to some exemplary implementations, offset 90 may be configured to yield no ligament 40 (0 ligament size). For example, erosion electrode 100 may have electrode radius 150 substantially equal to shank radius 70 of shank 50. Such a configuration may be used where erosion into a "skin" of frame 50 (typically 0.05"-0.25" thick) is acceptable, for example, where damage to the underlying portion of frame 50 is avoided. Such a configuration may be used where zero impact (punch-out force) is tolerable. According to some exemplary implementations, where a replacement fastener is provided to the same space, such replacement fastener may need to be oversize relative to the original fastener.

According to some exemplary implementations, offset 90 in the range of about 0.005 inches to about 0.010 inches is used in fragile or non-rigid structures where the punch-out force must, should, or may be minimal. In order to minimize or avoid damage to frame 50 by erosion electrode 100, concentric alignment may be sufficiently accurate to provide a level of concentricity precision.

According to some exemplary implementations, frame 50 having a more fragile structure will require smaller offset 90 to reduce the force required to sever ligament 40. For example, where frame 50 is a composite airframe, offset 90 may be less than about 0.015625 inches. In particular, offset 90 may be between about 0.010 inches and about 0.020 inches.

According to some exemplary implementations, offset 90 in the range of about 0.010 inches to about 0.015 inches is used in structures that tolerate moderate punch-out force. Accordingly, demands on concentricity are relaxed relative to more narrow offset 90.

According to some exemplary implementations, frame 50 having a somewhat less fragile structure may allow larger forces to act thereon, wherein offset 90 may be larger. For example, where frame 50 is an aluminum airframe, offset 90 may be less than about 0.03125 inches. In particular, offset 90 may be between about 0.020 inches and about 0.040 inches.

According to some exemplary implementations, offset 90 in the range of about 0.020 inches to about 0.025 inches is used where fastener 10 will be subjected to tensile stresses so great that fastener 10 will fail (i.e., sever at ligament 40) when weakened by the process. For example, frame 50 having one or more portions may provide stress on fastener 10 that cause it to readily separate into shank 30 and head 22 when sufficient erosion is provided. Such force and stress may be considered intrinsic forces applied to fastener 10. An intrinsic force may be one that exists and is applied to fastener 10 by virtue of frame 50. Intrinsic forces are contrasted with external forces, which require intervention by a user. This characteristic reduces demands on concentricity. Further, instantaneous "flash-burn" in composites may be minimized when fastener 10 fails. For fastener 10 of titanium or other sufficiently hard material, which is not under high forces, some degrees of punch-out force would be unacceptable where ligament 40 is not sufficiently thin.

Other, more durable structures for frame 50 may allow offset 90 to be less than about 0.0625 inches. In particular, offset 90 may exceed about 0.040 inches.

According to some exemplary implementations, offset 90 may be nonzero, such that frame 50 is not affected (i.e., remains intact) by the operation of erosion electrode 100.

According to some exemplary implementations, erosion electrode 100 may be rotated about an axis while being advanced longitudinally.

Figure 8:
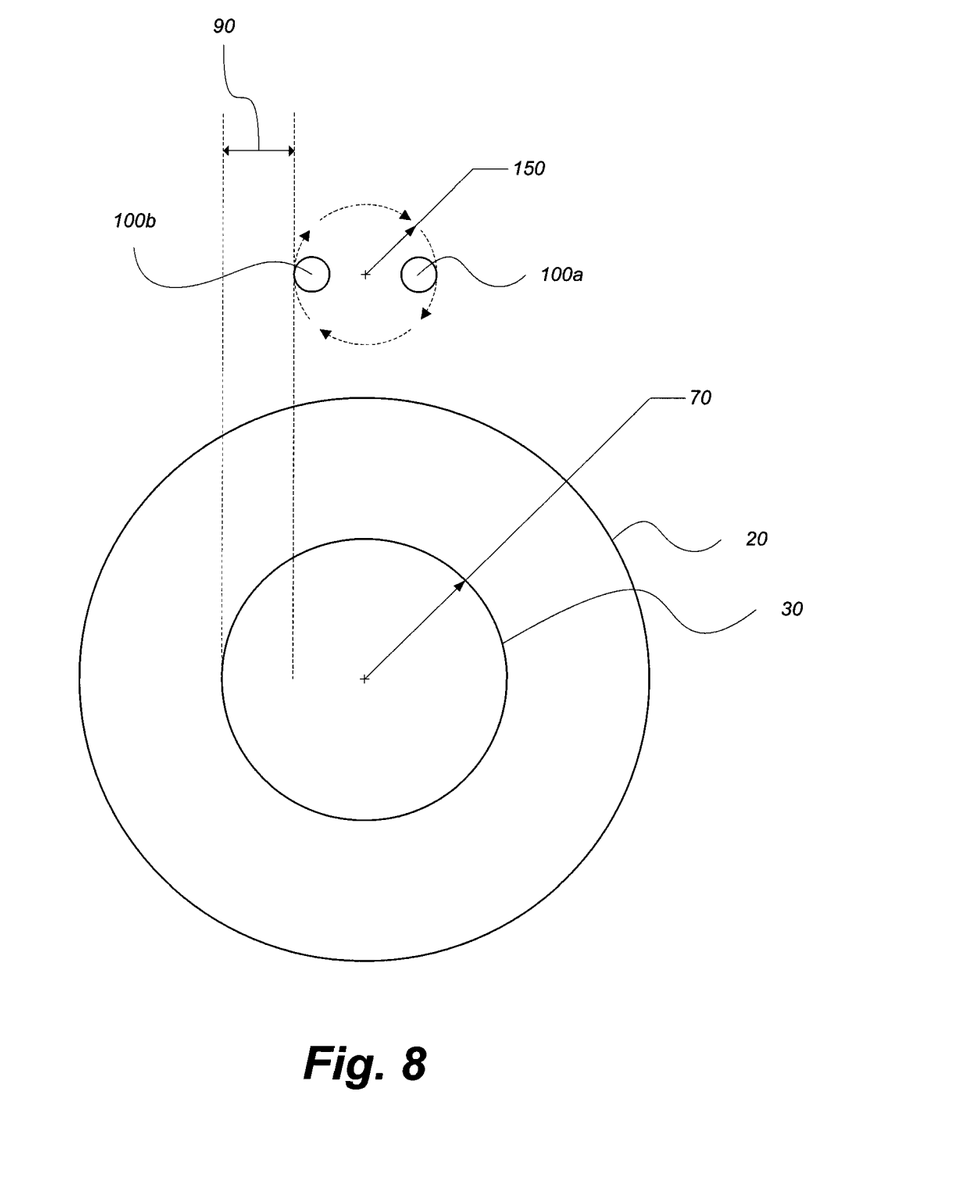
FIG. 8 shows a bottom view of an erosion electrode and a bottom view of a fastener.
Figure 9:
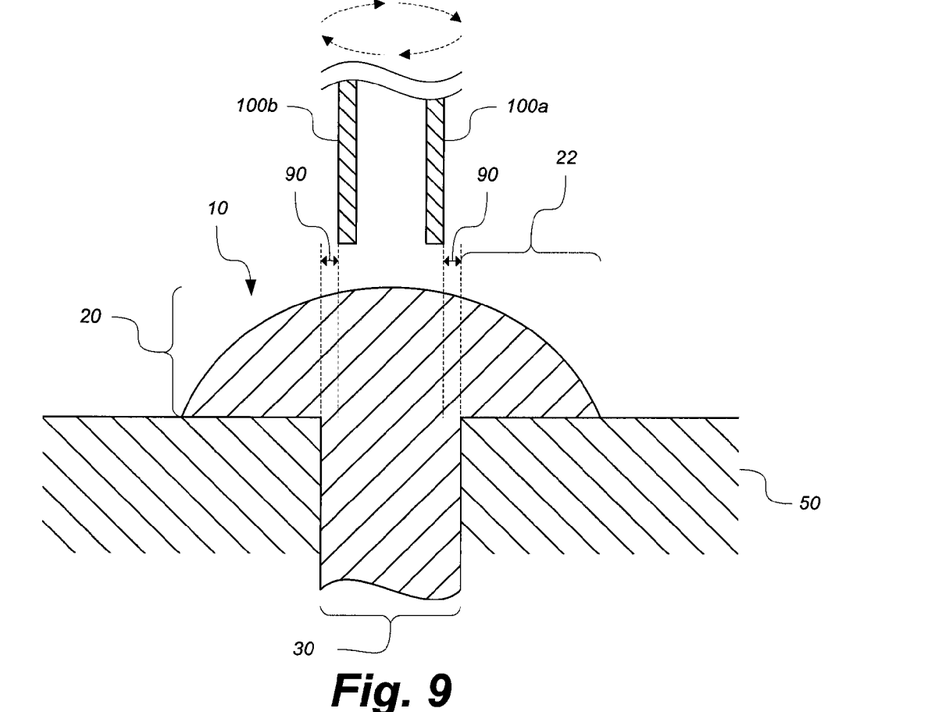
FIG. 9 shows a sectional view of an erosion electrode approaching a fastener.
Figure 10:
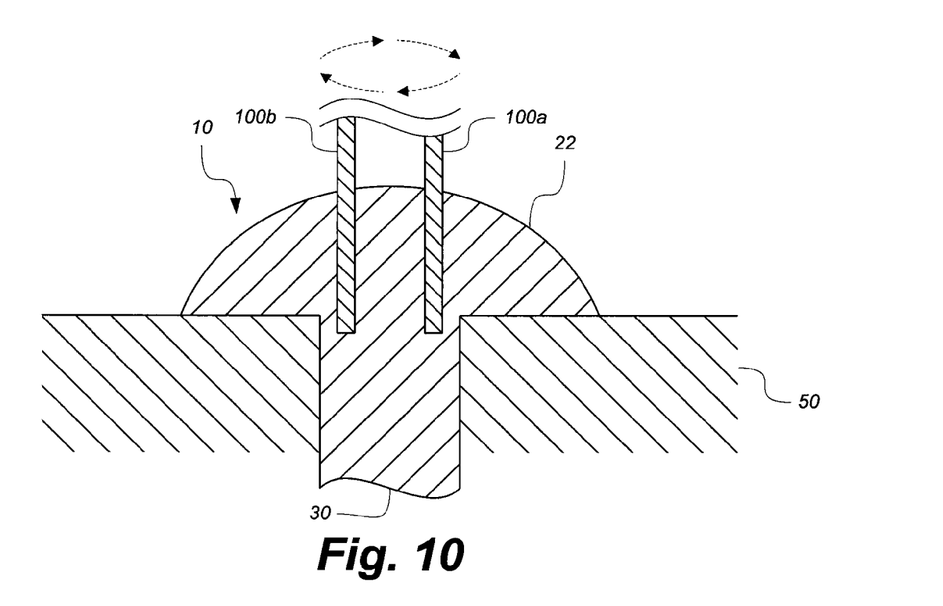
FIG. 10 shows a sectional view of an erosion electrode penetrating a fastener.

According to some exemplary implementations, erosion electrode 100 may include one or more point electrodes. As shown in FIGS. 8, 9, and 10, a plurality of point electrodes 100a and 100b may be provided and rotated about an axis while advancing longitudinally. Erosion electrodes 100a and 100b may cumulatively provide outer radius 150 defined by the rotation about an axis. The rotation and advancement or point electrodes 100a and 100b may result in an eroded space 200 similar to that caused by erosion electrode 100 as a hollow cylinder, as shown in FIG. 6. Accordingly, flange 22 may be removed in a manner as shown in FIG. 7.

Figure 11:
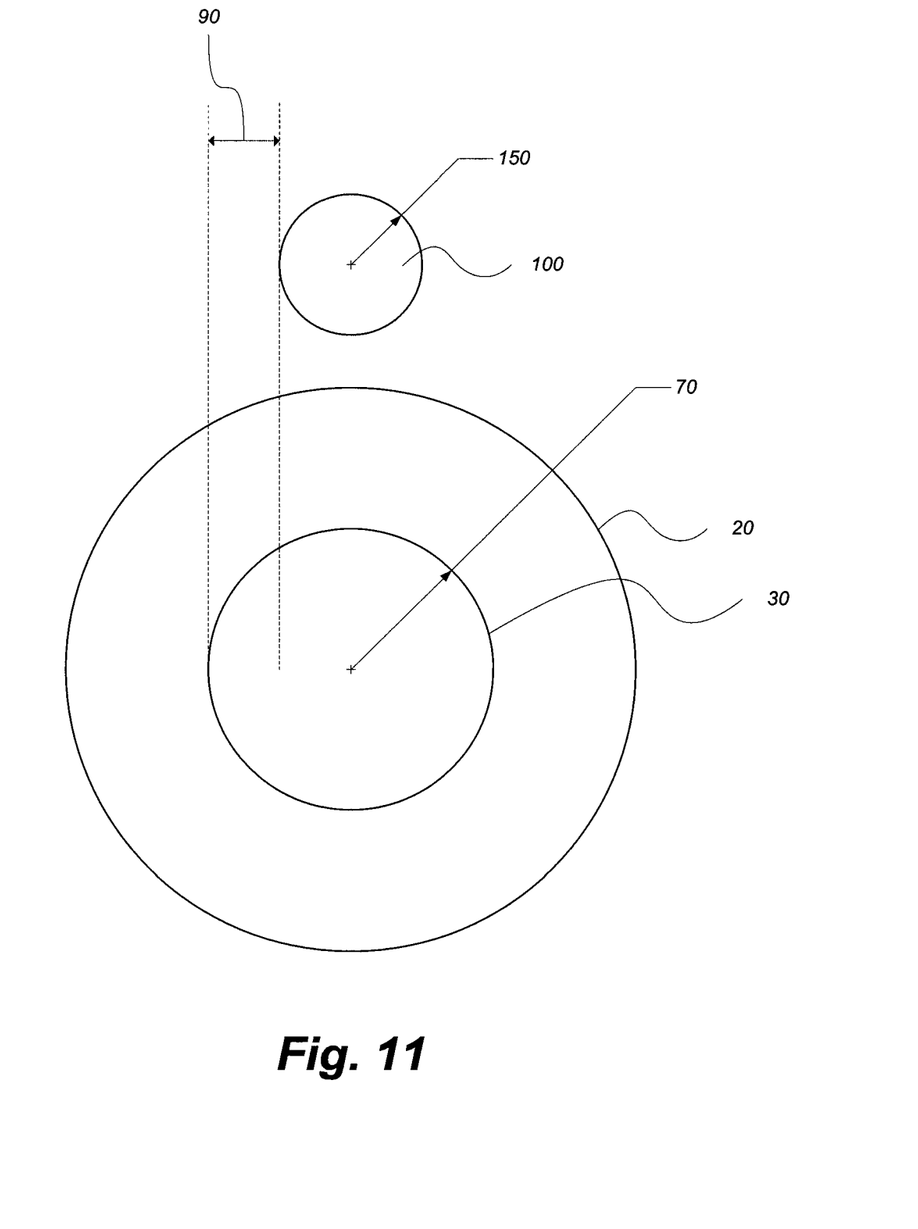
FIG. 11 shows a bottom view of an erosion electrode and a bottom view of a fastener.
Figure 12:
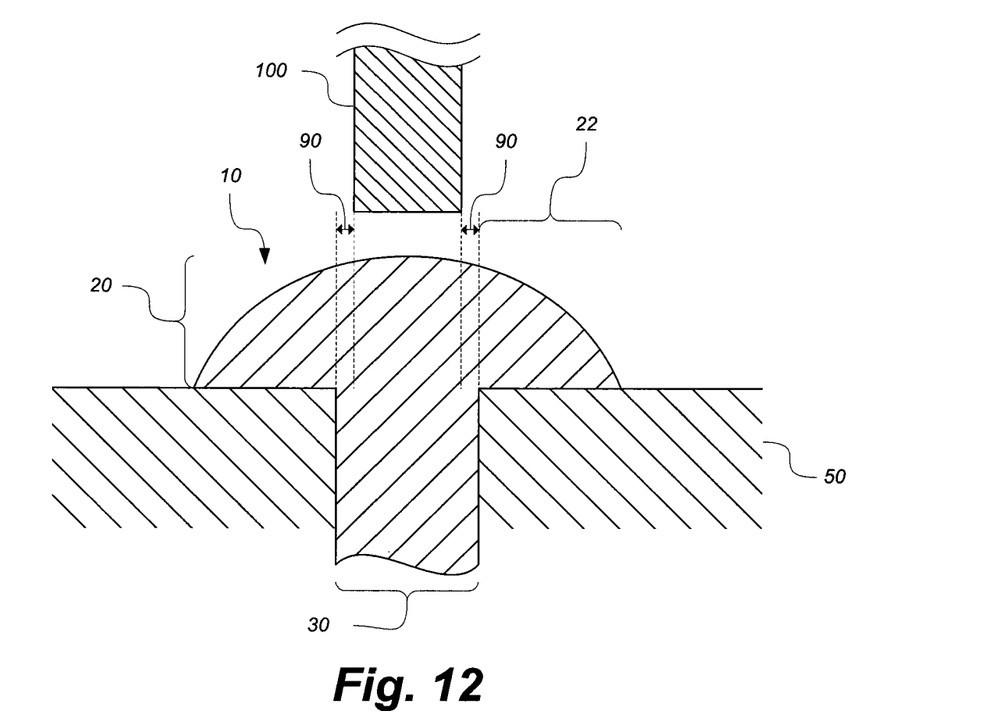
FIG. 12 shows a sectional view of an erosion electrode approaching a fastener.
Figure 13:
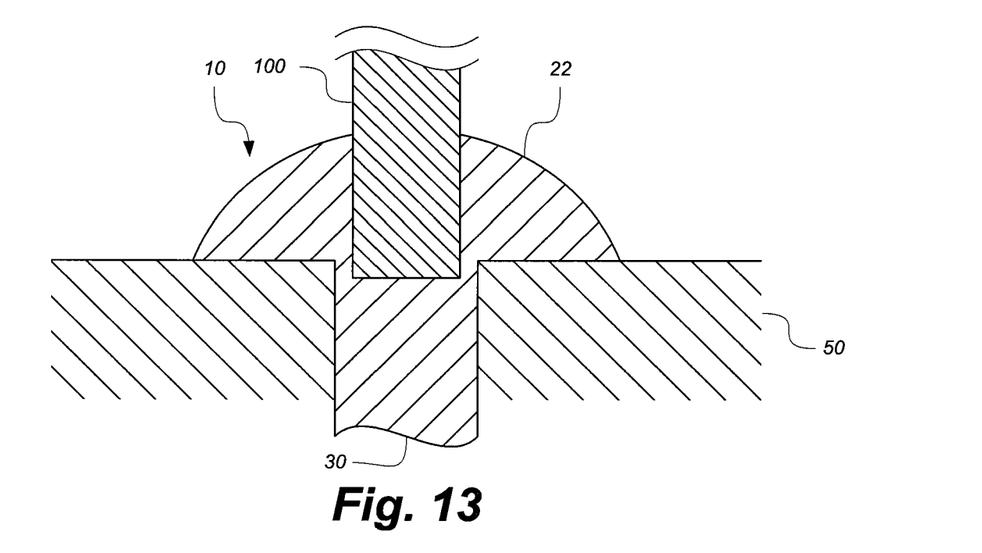
FIG. 13 shows a sectional view of an erosion electrode penetrating a fastener.
Figure 14:
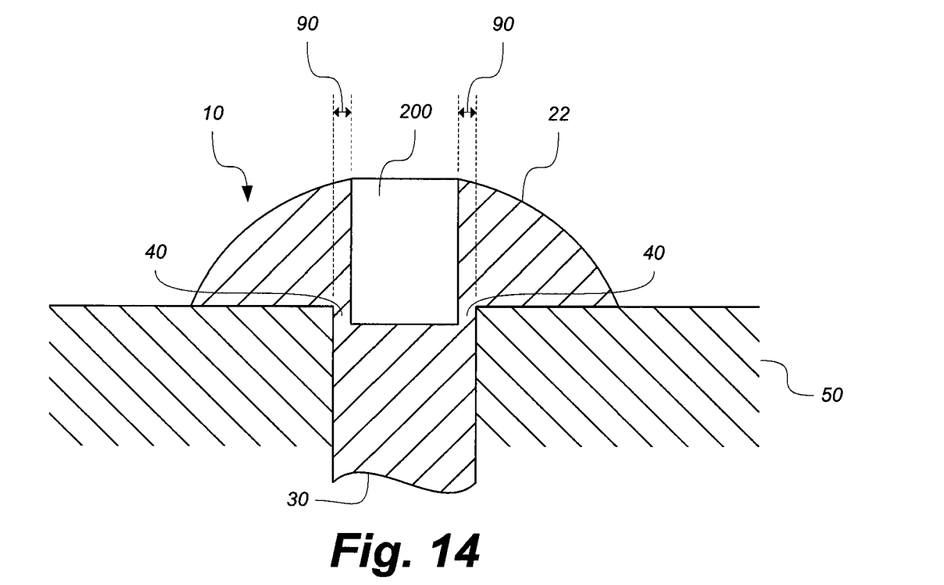
FIG. 14 shows a sectional view of an eroded space in a fastener.
Figure 15:
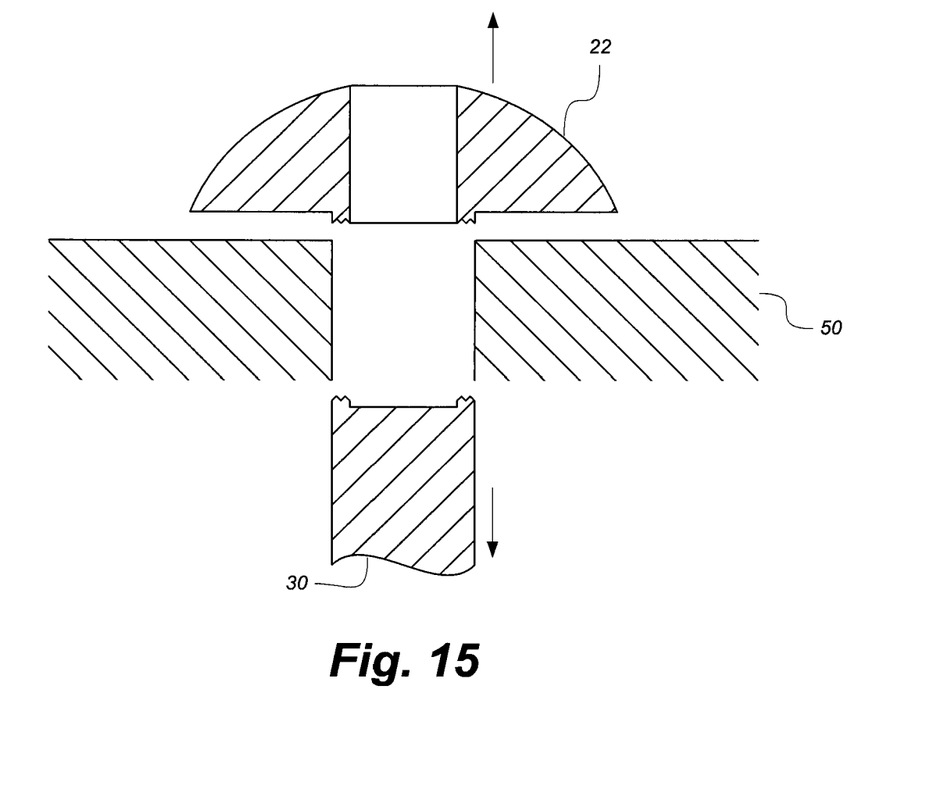
FIG. 15 shows a sectional view of a head of a fastener removed from the shank of the fastener.

According to some exemplary implementations, erosion electrode 100 may be a solid cylinder, as shown in FIGS. 11, 12, and 13. As shown in FIG. 14, erosion electrode 100 may define an uninterrupted eroded space 200. Accordingly, flange 22 may be removed, as shown in FIG. 15.

Figure 16:
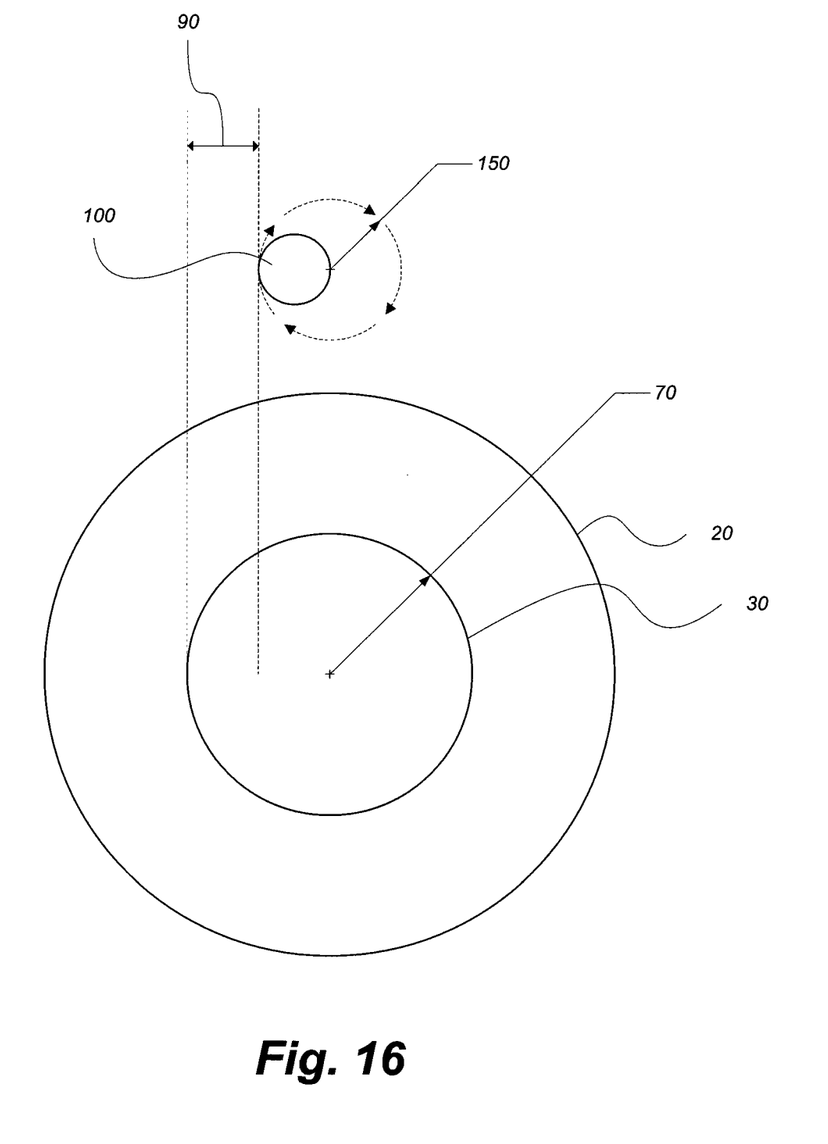
FIG. 16 shows a bottom view of an erosion electrode and a bottom view of a fastener.
Figure 17:
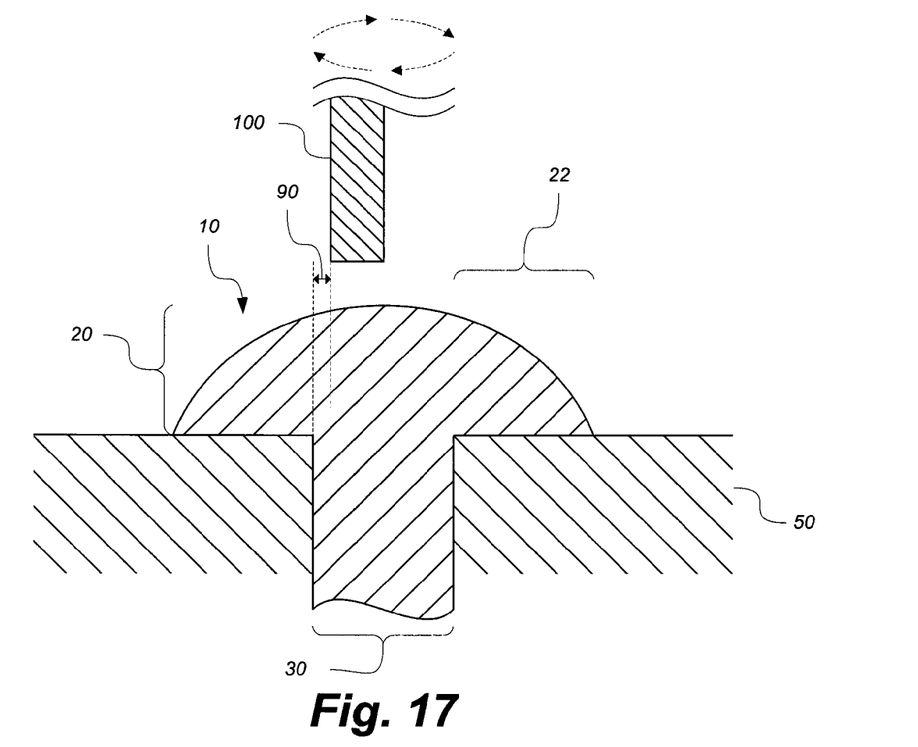
FIG. 17 shows a sectional view of an erosion electrode approaching a fastener.
Figure 18:
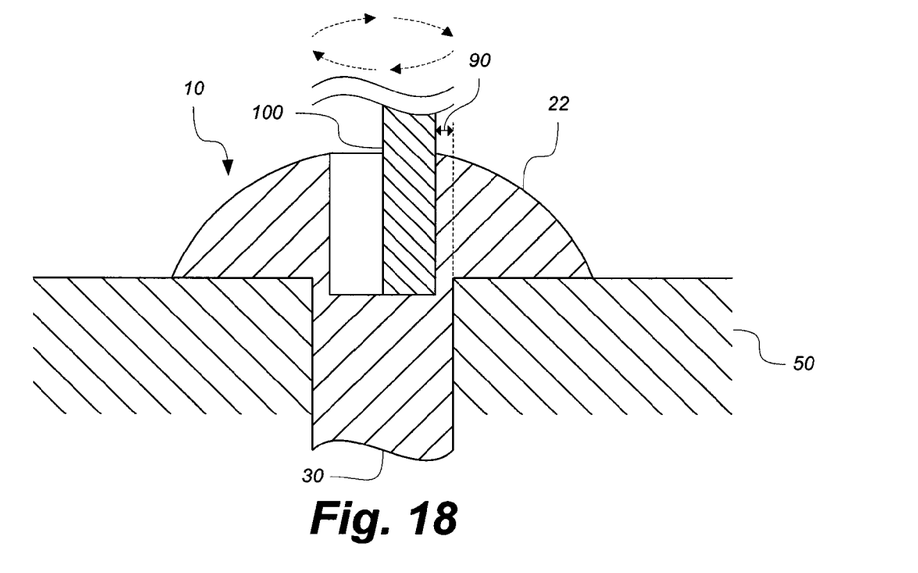
FIG. 18 shows a sectional view of an erosion electrode penetrating a fastener.

According to some exemplary implementations, erosion electrode 100 may rotate at least about an axis other than its own central axis. For example, as shown in FIGS. 16, 17, and 18, erosion electrode 100 may have a central axis parallel to, but not coaxial with, the central axis of fastener 10. Erosion electrode 100 may also be rotated about its own central axis. Such rotation(s) may be performed contemporaneously with longitudinal advancement of erosion electrode 100. According to some exemplary implementations, eroded space 200 resulting from such operations may be similar to that shown in FIG. 6 where erosion electrode 100 is sufficiently narrow, or similar to that shown in FIG. 14, where erosion electrode 100 is sufficiently wide. Accordingly, removal of flange 22 may be facilitated thereby.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A method of separating fastener shanks from heads, the method, comprising:
   Advancing, via electrical discharge machining, an erosion electrode longitudinally through a head and shank of a fastener which is held to a frame, the fastener being under stress from a collar attached to the fastener below the frame;
   the fastener having a the shank fixed within a hole in the frame; and,
   forming an eroded space in the shank, below the frame, equal to or less than the diameter of the hole.

2. The method of claim 1, wherein the erosion electrode is a hollow cylinder.

3. The method of claim 1, wherein the erosion electrode is a solid cylinder.

4. The method of claim 1, wherein the erosion electrode is configured to be rotated as it is advanced longitudinally.

5. The method of claim 1, the method further comprising applying a voltage difference between the erosion electrode and at least one of the fastener and the frame.

6. The method of claim 1, further comprising attaching a ground electrode configured to contact at least one of the fastener and the frame.

7. The method of claim 1, further comprising: forming a ligament in the shank between the head and a portion of the shank within the frame.

8. The method of claim 7, wherein ligament is a thickness configured to sever under an external force applied to the under stress ligament, said force being within an acceptable tolerance of the frame.

9. The method of claim 7, wherein the ligament is a thickness configured to sever under the intrinsic stress from the collar applied to the fastener.

10. A method of separating a fastener from two or more frames, comprising:
    providing an erosion electrode to a fastener fixed through and holding two frames together;

placing the electrode aligned with the shank of the fastener within the frame;

fastener having a head coaxially with the shank and extending beyond at least a portion of the frames;

the electrode, via electrical discharge machining, eroding a space within the fastener within the frames, the eroded space having an outer radius less than the outer radius of the shank, whereby a substantially concentric ligament of the shank is formed within the frame, the thickness of the ligament being defined by an offset between the outer radius of the eroded space and the outer radius of the shank.

11. The method of claim 10, creating an eroded space comprises:

providing a voltage difference between the erosion electrode and the fastener.

12. The method of claim 10, wherein creating an eroded space comprises:

advancing the erosion electrode longitudinally along the axis of the fastener.

13. The method of claim 10, wherein creating an eroded space comprises:

rotating the erosion electrode as it is advanced longitudinally.

14. The method of claim 10, wherein the alignment is concentric.

15. The method of claim 10, further comprising:

forming a thin ligament whereby applying an external force to the head will sever the fastener.

16. The method of claim 15, wherein the external force required to sever the ligament is within an acceptable tolerance of the frame.

* * * * *